United States Patent
Yang et al.

[11] Patent Number: 5,877,826
[45] Date of Patent: Mar. 2, 1999

[54] DUAL FREQUENCY SWITCHABLE CHOLESTERIC LIQUID CRYSTAL LIGHT SHUTTER AND DRIVING WAVEFORM

[75] Inventors: Deng-Ke Yang, Hudson; Ming Xu, Kent, both of Ohio

[73] Assignee: Kent State University, Kent, Ohio

[21] Appl. No.: 796,228

[22] Filed: Feb. 6, 1997

[51] Int. Cl.[6] .......................... G02F 1/133; G02F 1/1335; C09K 19/02
[52] U.S. Cl. ................ 349/36; 349/170; 349/98
[58] Field of Search .................. 349/36, 170, 98

[56] References Cited

U.S. PATENT DOCUMENTS

| | | | |
|---|---|---|---|
| 3,792,915 | 2/1974 | Soo Oh et al. ........................ | 349/168 |
| 4,236,155 | 11/1980 | Nagata ................................. | 349/170 |
| 4,836,654 | 6/1989 | Fujimura et al. .................... | 349/170 |
| 4,927,242 | 5/1990 | Aoki et al. ........................... | 349/170 |
| 5,621,552 | 4/1997 | Coates et al. ........................ | 349/86 |

OTHER PUBLICATIONS

Kawasumi, et al., "Novel memory effect found in nematic liquid crystal/fine particle system," Liquid Crystals, 1996, vol. 21, No. 6, pp. 769–776; Jul. 1996.

Hasegawa, et al., "Reversible electro–optical switching of a memory type PDLC using two–frequency–addressing liquid crystals," Liquid Crystals, 1996, vol. 21, No. 5, pp. 765–766; May, 1996.

Schadt, "Low–Frequency Dielectric Relaxations in Nematics and Dual–Frequency Addressing of Field Effects," Mol. Cryst. Liq. Cryst., 1982, vol. 89, pp. 77–92.

Schadt, "Effects of dielectric relaxations and dual–frequency addressing on the electro–optics of guest–host liquid cyrstal displays," Appl. Phys. Lett., vol. 42, No. 8, 15 Oct. 1982, pp. 697–699.

Bücher, et al., "Frequency–addressed liquid crystal field effect," Applied Physics Letters, vol. 25, No. 4, 15 Aug. 1974, pp. 186–188.

de Jeu, et al., "Nematic Phenyl Benzoates in Electric Fields I. Static and Dynamic Properties of the Dielectric Permittivity," Mol. Cryst. Liq. Cryst., vol. 26, pp. 225–234; Aug., 1972.

Stein, et al., "A Two–Frequency Coincidence Addressing Scheme for Nematic–Liquid–Crystal Displays," Applied Physcis Letters, vol. 19, No. 9, pp. 343–345, 1 Nov. 1971.

Wild, et al., "Turn–On Time Reduction and Contrast Enhancement in Matrix–Addressed Liquid Crystal Light Valves," Applied Physics Letters, vol. 19, No. 9, 1 Nov. 1971.

Meier and Saupe, "Dielectric Relaxation in Nematic Liquid Crystals," Molecular Crystals, vol. 1, pp. 515–525, 1966.

*Primary Examiner*—William L. Sikes
*Assistant Examiner*—Tarifur R. Chowdhury
*Attorney, Agent, or Firm*—Renner, Kenner, Greive, Bobak, Taylor & Weber

[57] ABSTRACT

A liquid crystal shutter and a drive waveform for controlling the same is presented by this invention. The liquid crystal shutter includes two distinct layers of liquid crystal material where one layer has a right hand twist sense and the other layer has a left hand twist sense. An electric field is selectively applied to the layers of liquid crystal material which have dual frequency properties. Accordingly, when a low frequency is applied to the liquid crystal materials they exhibit a positive dielectric anisotropy and a homeotropic texture which is substantially transparent. When a high frequency electric field is applied to the liquid crystal materials they exhibit a negative dielectric anisotropy and a planar texture which is substantially reflective. The liquid crystal material may be selected to selectively reflect predetermined spectrums of light. By alternatingly applying low and high frequencies to the liquid crystal shutter, the transition time between the transparent and reflective states is minimized.

17 Claims, 4 Drawing Sheets

DUAL FREQUENCY SWITCHABLE CHOLESTERIC LIQUID CRYSTAL LIGHT SHUTTER AND DRIVING WAVEFORM

GOVERNMENT RIGHTS

The United States Government has a paid-up license in this invention and may have the right in limited circumstances to require the patent owner to license others on reasonable terms as provided for by the terms of Grant No. DMR-8920147-05, awarded by the National Science Foundation.

TECHNICAL FIELD

The present invention resides generally in the art of liquid crystal shutters.

More particularly, the present invention relates to a dual frequency switchable cholesteric liquid crystal shutter that changes appearance depending upon the frequency of the electric field applied to the shutter. Specifically, the present invention is directed to a liquid crystal shutter that employs a waveform of alternating high and low frequencies to accelerate the transition between transparent and reflective states.

BACKGROUND ART

It is well known that cholesteric liquid crystal materials have a helical structure. With the cholesteric liquid crystal in a planar texture, the helical axis of the material is perpendicular to the surface of a liquid crystal cell. In the planar texture, the liquid crystal reflects a color light at the wavelength $\lambda=nP$, where "n" is the average refractive index and "P" is the pitch length of the material. The width of the reflection band, or how much of the color spectrum is reflected, is $\Delta\lambda=\Delta nP$, where $\Delta n$ is the birefringence of the material. Light incident upon a cell employing cholesteric liquid crystal material that is in a planar texture reflects circularly polarized light having the same twist sense as the liquid crystal material. In other words, right-handed cholesteric liquid crystal material reflects right circularly polarized light of the proper wavelength, but transmits left circularly polarized light.

In order to reflect both right and left circularly polarized light of a desired wavelength, two layers of cholesteric liquid crystal must be used. The first layer, which has a right twist sense, reflects right circularly polarized light and the second layer, which has a left twist sense, reflects left circularly polarized light. This reflection of the incident light is independent of the light polarization state, and as such the light in the reflection band is totally reflected.

Cholesteric liquid crystal material may be provided with a positive dielectric anisotropy. When a sufficiently high electric field is applied to such a material, the material is switched to a homeotropic texture and the material becomes transparent. When the high electric field is turned off, the liquid crystal material relaxes back to the planar texture and becomes reflective. Unfortunately, the relaxation time, that is the time it takes for the liquid crystal material to reconfigure from a homeotropic texture to a planar texture, is about 10 seconds. In many applications, a relaxation time of 10 seconds is much too long. One example of where a liquid crystal shutter may be used is in welding goggles. When welding, a welder needs to block or reflect any bright light that might otherwise damage his or her eyes. Goggles employing the above liquid crystal material would be effective in reflecting the harmful light, but would be inconvenient for use by the welder due to the long relaxation time.

Based upon the foregoing it is evident that there is a need in the art for a liquid crystal shutter that can transition between transparent and reflective states faster than 10 seconds. Furthermore, there is a need for such a liquid crystal shutter and an electric field driving waveform that minimizes the relaxation or transition time between transparent and reflective states.

DISCLOSURE OF INVENTION

In light of the foregoing, it is a first aspect of the present invention to provide a dual frequency switchable cholesteric liquid crystal shutter and a driving waveform for operating the same, wherein the liquid crystal material has a positive dielectric anisotropy when an electric field of low frequency is applied thereto and a negative dielectric anisotropy when an electric field of high frequency is applied.

Another aspect of the present invention is to provide a liquid crystal shutter that is either reflective or transparent depending upon the frequency of the electric field applied to the shutter.

Still another aspect of the present invention, as set forth above, is to provide an electric field at a range of low frequency to cause the liquid crystal material to exhibit a homeotropic texture with a substantially transparent state.

Yet another aspect of the present invention, as set forth above, is to provide an electric field at a range of high frequency to cause the liquid crystal material to exhibit a planar texture with a substantially reflective state.

A further aspect of the present invention, as set forth above, is to provide a liquid crystal polarizer that has a transition time between the homeotropic texture and the planar texture of anywhere between 50 milliseconds and 1 second.

Yet a further aspect of the present invention, as set forth above, is to provide a driving waveform that applies an electric field of alternating low and high frequencies to the liquid crystal shutter to minimize the transition time.

Still a further aspect of the present invention, as set forth above, is to provide a driving waveform that transforms the liquid crystal material from a homeotropic texture to an intermediate transient planar texture having a pitch of 2P, and then to a substantially reflective planar texture having an intrinsic pitch P.

Still yet another aspect of the present invention, as set forth above, is to provide a shutter that when in the reflective state only reflects a predetermined spectrum of light.

The foregoing and other aspects of the present invention which shall become apparent as the detailed description proceeds are achieved by a liquid crystal shutter, comprising: liquid crystal material disposed between first and second substrates comprising a first layer having a first twist sense and a second layer having a second twist sense opposite said first twist sense; and means for addressing said material with at least two distinct ranges of frequency from an electric field, wherein application of one of said ranges of frequency between said substrates causes said material to exhibit a positive or negative dielectric anisotropy and wherein application of said other range of frequency between said substrates causes said material to exhibit the other of a positive and negative dielectric anisotropy.

Other aspects of the present invention are attained by a method for addressing a liquid crystal shutter comprising the steps of: providing a liquid crystal material between first and second substrates, said material having a first layer with a first rotational twist sense and a second layer with a second rotational twist sense; applying a first frequency electric field to said material to obtain a first texture; and applying a second frequency electric field to said material to obtain a second texture.

BRIEF DESCRIPTION OF THE DRAWINGS

For a complete understanding of the objects, techniques and structure of the invention, reference should be made to the following detailed description and accompanying drawings wherein.

BEST MODE FOR CARRYING OUT THE INVENTION

Figure 1A:
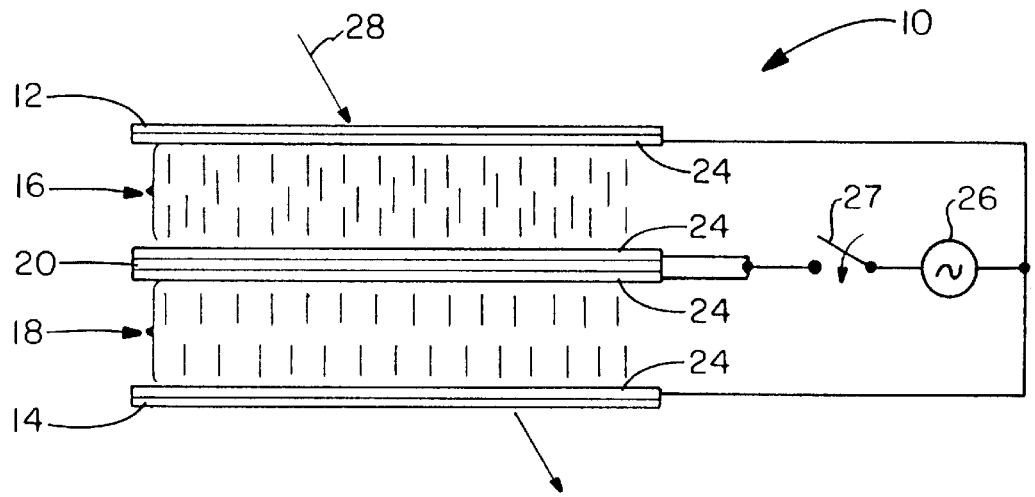
FIGS. 1A–C are schematic representations of a liquid crystal shutter according to the present invention.

Referring now to the drawings and more particularly to FIG. 1, it can be seen that a liquid crystal shutter according to the present invention is designated generally by the numeral 10. The polarizer 10 includes a first substrate 12 opposed by a second substrate 14. Both substrates 12 and 14 may be made of plastic, glass or any other substantially transparent material known in the art. Disposed between the first and second substrates 12 and 14 is a first layer of liquid crystal material 16 and a second layer of liquid crystal material 18. In the preferred embodiment, the material 16 is cholesteric, also referred to as chiral nematic, and has a right hand twist sense that reflects right circularly polarized light. The first layer of material 16 also has dual frequency properties. In other words, when a low frequency electric field is applied to the first layer of material it has a positive dielectric anisotropy. When a high frequency electric field is applied to the first layer of material 16, it has a negative dielectric anisotropy. Those skilled in the art will appreciate that the dual frequency material has a cross-over frequency which is that point where the liquid crystal material changes from a positive to a negative dielectric anisotropy, or vice-versa. The second layer of liquid crystal material 18 provides the same attributes as the first layer of liquid crystal material 16 except that the layer of material 18 provides a left hand rotational twist sense. As such, the second layer of liquid crystal material 18 reflects left circularly polarized light.

A third substrate 20, which may be plastic, glass or any other appropriate substantially transparent material, is interposed between the first layer of liquid crystal material 16 and the second layer of liquid crystal material 18. The substrate 20 functions to separate the layers 16 and 18 from one another so that they maintain their distinct and opposite rotational twist senses. Disposed between all of the substrates and their respective liquid crystal material are electrodes 24, which in the preferred embodiment are transparent and made of indium-tin-oxide. The substrates are spaced and their edges sealed by methods well known in the art. A power source 26 is connected to the electrodes 24 with a switch 27 interposed between the power source 26 and the electrodes mounted upon both sides of the substrate 20. By closing the switch 27, an electric field is applied between the substrates 20 and 12 to effect the layer of liquid crystal material 16 while simultaneously an electric field is applied between substrates 20 and 14 to impart an electrical field upon the layer of liquid crystal material 18.

As described in the Background Art, a shutter is obtained when two layers of cholesteric liquid crystals with respective left and right handed helical twists are employed. When a sufficiently high electric field is applied to both layers that have a cholesteric liquid crystal with positive dielectric anisotropy, the material is switched to the homeotropic texture and the material becomes substantially transparent. In the present invention, the layers of liquid crystal material 16 and 18 employ dual frequency properties. Therefore, as seen in FIG. 1A, when a sufficiently high voltage, low frequency electric field is applied between substrates 12 and 20 and between substrates 14 and 20, the layers of material 16 and 18 have a positive dielectric anisotropy and the materials exhibit a homeotropic texture which is substantially transparent. As such, incident light 28 is transmitted through substrates 12, 20 and 14.

Figure 1B:
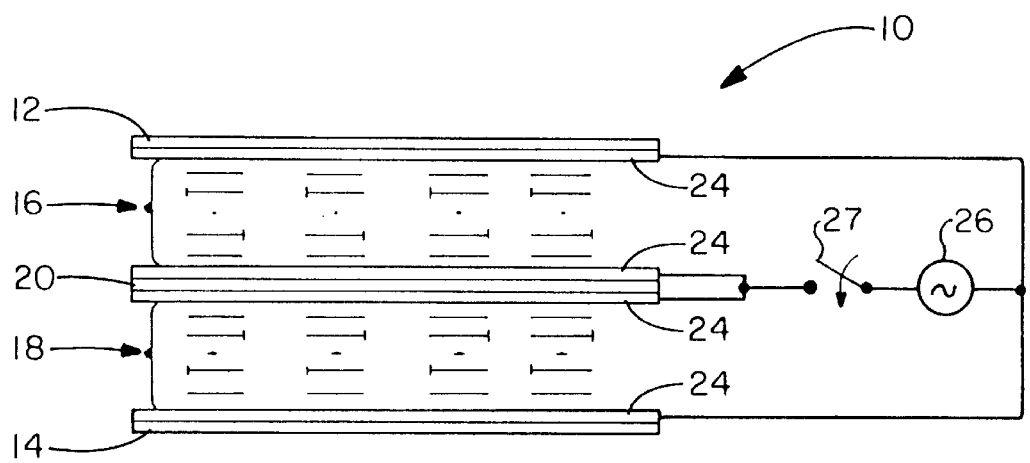
Figure 1C:
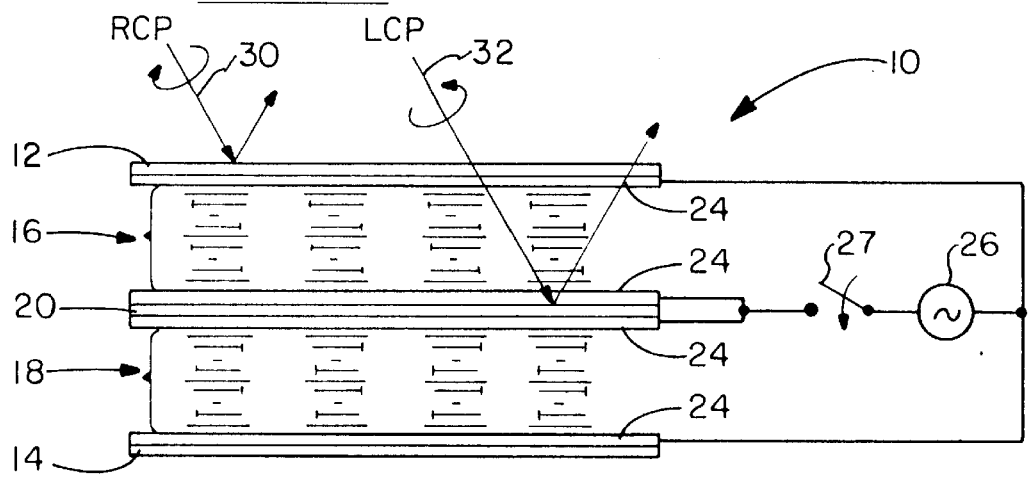

Referring now to FIG. 1C it can be seen that when a sufficiently high voltage, high frequency electric field is applied to the layers of liquid crystal material 16 and 18, they have a negative dielectric anisotropy. Accordingly, the high frequency electric field drives the material in layers 16 and 18 to a planar texture which is substantially reflective. As such, right circularly polarized light 30 is reflected by the first layer of liquid crystal material 16 and left circularly polarized light 32 is reflected by the second layer of liquid crystal material 18. By employing dual frequency liquid crystal material in the shutter 10 and first applying a low frequency and then a high frequency electric field to the polarizer, it has been found that the homeotropic-planar transition time can be reduced to about one second.

In another embodiment, which further improves the homeotropic-planar transition time, it has been found that by alternating low and high frequencies applied to the polarizer 10 even faster transition times can be obtained. The relaxation from the homeotropic texture to a planar texture takes place in two steps. First, the homeotropic texture may be driven to a transient planar texture having a pitch of about 2P. Next, the transient planar texture can be driven to a planar texture having the intrinsic pitch P. It has been determined that if the high frequency field is always applied during the relaxation cycle, the transient planar—planar transition is hindered or slowed.

Figure 2:
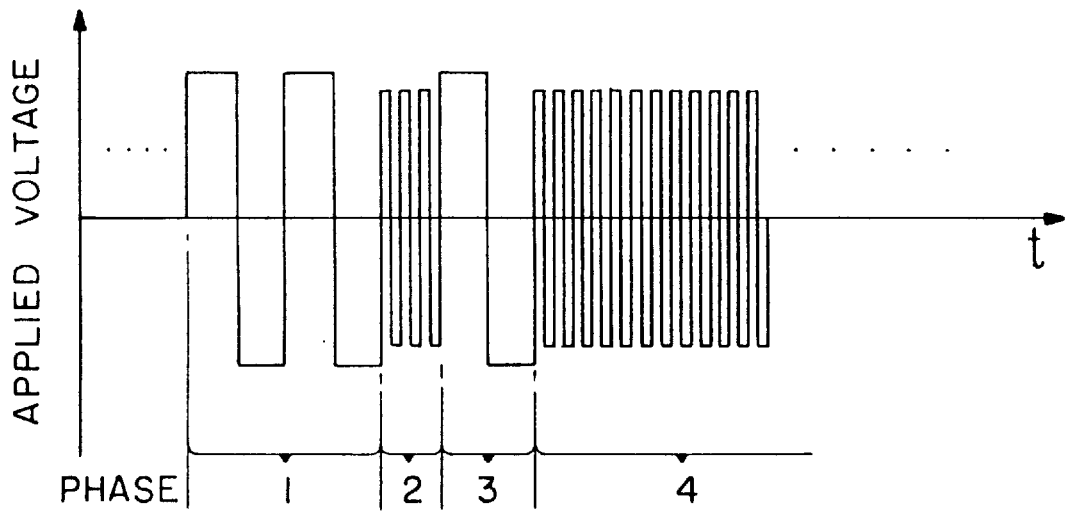
FIG. 2 is a schematic waveform employed to drive the liquid crystal shutter from one state to another.

To overcome the slow transient planar to planar transition, a drive scheme, as shown in FIG. 2, has been developed. In phase 1 of FIG. 2, a low frequency electric field drives the layers of liquid crystal material 16 and 18 to the homeotropic texture as shown in FIG. 1A. In phase 2, a high frequency electric field drives the layers of liquid crystal material 16 and 18 from the homeotropic texture to a transient planar texture having a pitch of about 2P as best seen in FIG. 1B. In phase 3, a low frequency electric field initiates the transition from the transient planar texture to the planar texture. In phase 4, a high frequency electric field drives the layers of liquid crystal material 16 and 18 to the planar texture as seen in FIG. 1C. The pitch of the liquid crystal material 16 and 18 as shown in FIG. 1C has an intrinsic pitch P and provides a substantially reflective state. The color of the light reflected is dictated by the width of the reflection band which is set by the composition of the liquid crystal material employed. It has been found that when the drive scheme employed in FIG. 2 is used, the homeotropic-planar transition time may be shortened to about 50 milliseconds.

Provided below are examples of shutters having various liquid crystal material compositions subjected to different applications of electric fields. These examples are in no way limiting and are exemplary of the improved transition times provided by the present invention.

Example I

Nematic East Kodak 11650: 75.6 weight %
Nematic ZLI 4330 (from EM): 9.4 weight %
Chiral Agent R811 (from EM): 6.4 weight %
Chiral Agent CE2 (from EM): 6.4 weight %
Chiral Agent R1011 (from EM): 2.2 weight %

Figure 3:
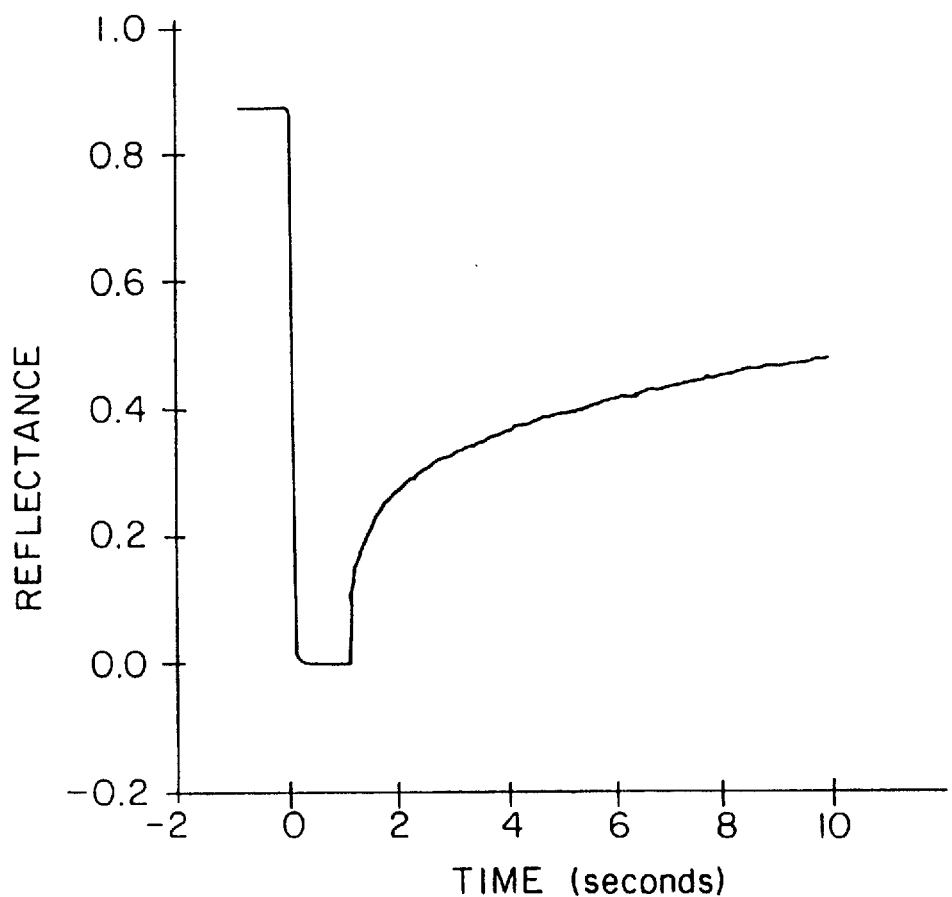
FIG. 3 is a graphical representation of reflection vs. time of a shutter in which only a low frequency electric field is applied.

The above material was filled into a five micron cell and reflects red light. In this embodiment, only a phase 1 low frequency signal was applied. FIG. 3 shows a reflective vs. time graph for Example I. An electric field of 60 volts and 100 hertz was applied to drive the material to the homeotropic texture. The voltage field was removed and the material was allowed to relax. The complete relaxation time was found to be about 40 seconds.

Example II

Nematic East Kodak 11650: 75.6 weight %
Nematic ZLI 4330 (from EM): 9.4 weight %
Chiral Agent R811 (from EM): 6.4 weight %
Chiral Agent CE2 (from EM): 6.4 weight %
Chiral Agent R1011 (from EM): 2.2 weight %

Figure 4:
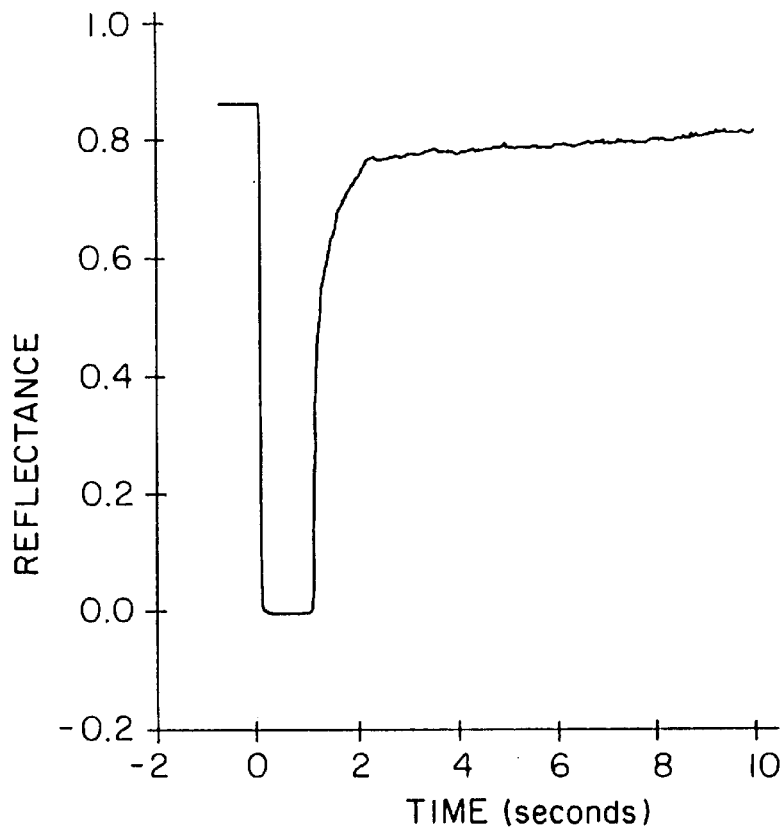
FIG. 4 is a graphical representation of reflection vs. time of a shutter in which a low frequency and then a high frequency electric field is applied.

Example II provides the same material of Example I but uses a different drive scheme. In this embodiment, a drive scheme was employed that utilized phase 1 having an electric field of 60 volts and 100 hertz. In phase 2 an electric field of 88 volts was applied with a frequency of 10 kilohertz for a period of 10 seconds. In phase 1, the material was driven to the homeotropic texture and then in phase 2 the material was driven to the planar texture. As seen in FIG. 4, the relaxation time was found to be about 1 second.

Example III

Nematic East Kodak 11650: 42.5 weight %
Nematic ZLI 4330 (from EM): 42.5 weight %
Chiral Agent R811 (from EM): 6.4 weight %
Chiral Agent CE2 (from EM): 6.4 weight %
Chiral Agent R1011 (from EM): 2.2 weight %

The above material was filled into a five micron cell and reflects red light. In this embodiment, the waveform of FIG. 2 was employed as follows.

Figure 5:
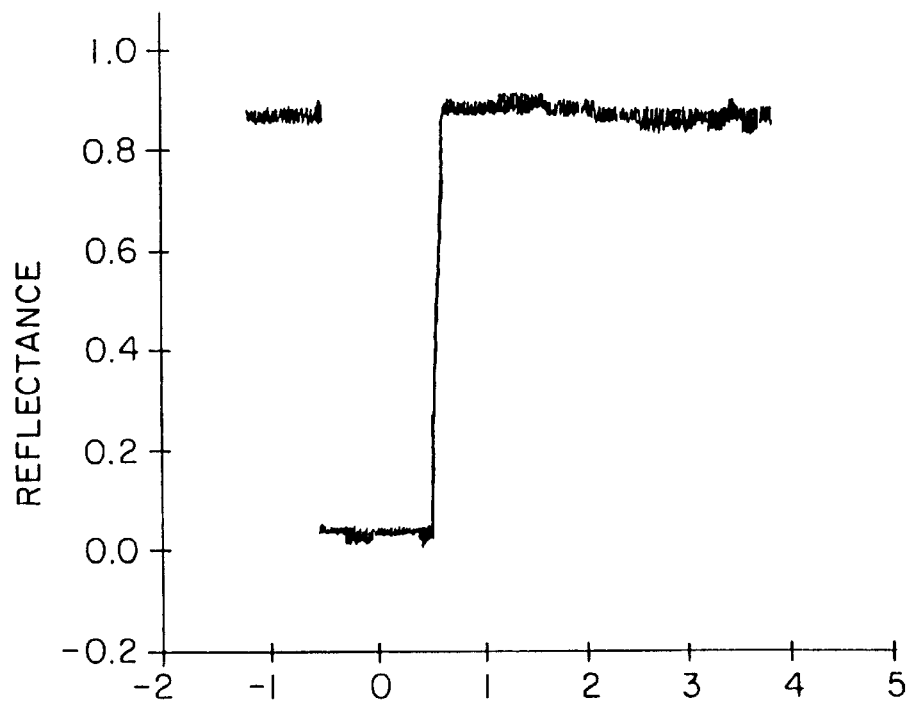
FIG. 5 is a graphical representation of reflection vs. time of a shutter in which the waveform of FIG. 2 is applied.

Phase 1 used a 93 volt electric field with a frequency of 100 hertz. Phase 2 employed an electric field of 93 volts and a frequency of 10 kilohertz for a period of 5 milliseconds. Phase 3 employed a 93 volt signal with a frequency of 50 hertz for a period of 20 milliseconds and Phase 4 employed a 140 volt signal at 14.3 kilohertz for a period of 4 seconds. Phase 1 drove the material to the homeotropic texture and phase 2 drove the material to the transient planar texture. Phase 3 initiated the transient planar-planar transition while Phase 4 drove the material to the planar texture. As evidenced by FIG. 5, the relaxation time was found to be about 100 milliseconds for this example.

Example IV

Nematic 2F-3333 (Rolic): 82.5 weight %
Chiral Agent R811 (from EM): 7.5 weight %
Chiral Agent CE2 (from EM): 7.5 weight %
Chiral Agent R1011 (from EM): 2.5 weight %

Figure 6:
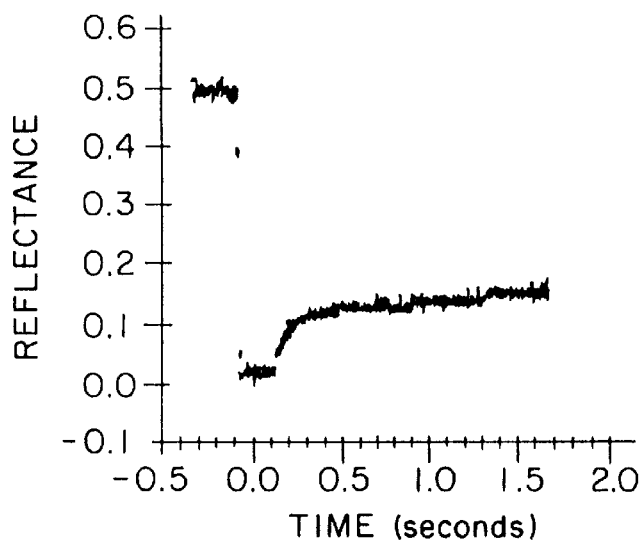
FIG. 6 is a graphical representation of reflection vs. time of a polarizer in which only a low frequency electric field is applied.
Figure 7:
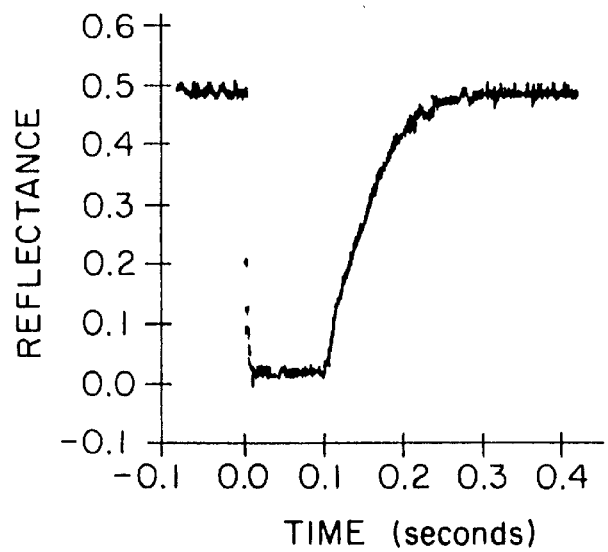
FIG. 7 is a graphical representation of reflection vs. time of the same shutter used in FIG. 6 in which a low frequency and then a high frequency electric field is applied.
Figure 8:
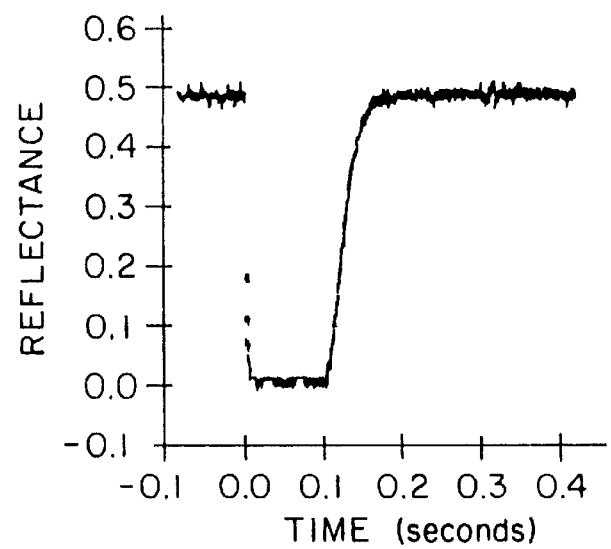
FIG. 8 is a graphical representation of reflection vs. time of the same shutter used in FIG. 6 in which the waveform of FIG. 2 is applied.

This material was filled into a 5 micron cell and reflects red light. Various driving schemes were applied to the above material and are represented in FIGS. 6–8. FIG. 6 shows the response of the above liquid crystal material upon application of an electric field where a low frequency voltage drives material to the homeotropic texture and then the material relaxes to the planar texture at zero field. It was found that the relaxation time of this particular drive scheme was about 5 seconds. FIG. 7 shows where a low frequency voltage drives the same material to the homeotropic texture and where the material relaxes to the planar texture at a high frequency voltage. The relaxation time for this particular drive scheme was found to be about 150 milliseconds. FIG. 8 shown the response of the above material in the case where the drive waveform shown in FIG. 2 is used. The relaxation time for the above material and the preferred drive waveform was found to be about 50 milliseconds.

Thus it can be seen that the objects of the invention have been satisfied by the liquid crystal shutter and associated drive waveform. The polarizer 10 can be employed to reflect undesired light in predetermined light spectrums. For example, the shutter 10 may be used in goggles worn by aircraft fighter pilots to protect the pilot's eyes from targeting laser beams that may be directed toward the pilot's aircraft. The shutter 10 may also be employed by welders and other workers where exposure to very bright light may otherwise damage their eyes. As such, a person using goggles with the liquid crystal shutter 10 may switch their goggles to be either substantially transparent or reflect light in a predetermined spectrum. By virtue of the drive scheme disclosed herein, the transition between reflective and transparent states can be quickly achieved. Of course, other applications may be benefitted by using the liquid crystal shutter 10 and associated drive waveform.

While in accordance with the patent statutes only the best mode and preferred embodiments of the invention have been presented and described in detail, it is to be understood that the invention is not limited thereto or thereby. Accordingly, for an appreciation of the true scope and breadth of the invention reference should be made to the following claims.

What is claimed is:

1. A liquid crystal shutter, comprising:
   a cholesteric liquid crystal material disposed between first and second substrates comprising a first layer having a first twist sense and a second layer having a second twist sense opposite said first twist sense, wherein a third substrate is interposed between said first and second substrates to separate said first and second layers; and
   means for simultaneously addressing said first and second layers with at least two distinct ranges of frequency of an electric filed, wherein application of a low range of frequency between said first and third substrates and between said second and third substrates causes said layers to exhibit a positive dielectric anisotropy and wherein application of a high range of frequency between said first and third substrates and between said second and third substrates causes said layers to exhibit a negative dielectric anisotropy, wherein said negative dielectric anisotropy causes said material to be switched to a state which reflects both right and left circularly polarized light incident thereto within a predetermined spectrum of light while allowing remaining spectrums of light to be transmitted through said substrates, and wherein said positive dielectric anisotropy causes said material to be switched to a state which is transparent.

2. The liquid crystal shutter according to claim 1, wherein said material exhibits a homeotropic texture at said range of low frequency.

3. The liquid crystal shutter according to claim 1, wherein said material exhibits a planar texture at said range of high frequency.

4. The liquid crystal shutter according to claim 1, wherein the transition time of said material from transparent to reflective is less than 1 second.

5. The liquid crystal shutter according to claim 1, wherein said means for simultaneously addressing alternatingly applies a range of different low and high frequencies that causes said material to evolve from a transparent to a selectively reflective state.

6. The liquid crystal shutter according to claim 5, wherein the transition time of said material from transparent to reflective is less than 100 milliseconds.

7. The liquid crystal shutter according to claim 1, wherein said means for addressing provides a transition time between positive and negative dielectric anisotropies of between about 50 milliseconds and about 1 second.

8. A method for addressing a liquid crystal shutter comprising the steps of:
   providing a cholesteric liquid crystal material between first and second substrates, said material having a first layer with a first rotational twist sense and a second layer with a second rotational twist sense;
   providing a third substrate between said first and second substrates to separate said first layer from said second layer;
   simultaneously applying a first frequency electric field between said first and third substrates and between said second and third substrates to cause said first and second layers to obtain a first texture;
   simultaneously applying a second frequency electric field between said first and third substrates and between said second and third substrates to cause said first and second layers to obtain a second texture.

9. The method according to claim 8, wherein said step of simultaneously applying a first frequency comprises the step of;
   applying a range of low frequency to said first and second layers to cause both said layers to become substantially transparent.

10. The method according to claim 9, further comprising the step of exhibiting a homeotropic texture when said range of low frequency is applied to said material.

11. The method according to claim 8, wherein said step of simultaneously applying a second frequency comprises the step of:
    applying a range of high frequency to said first and second layers to cause both said layers to reflect both right and left circularly polarized light within a predetermined spectrum of light whiled allowing remaining spectrums of light to be transmitted.

12. The method according to claim 11, further comprising the step of exhibiting a planar texture when said range of high frequency is applied to said material.

13. The method according to claim 8, wherein said steps of simultaneously applying further comprise the steps of:
    applying said range of low frequency electric field to cause both said layers to exhibit a positive dielectric anisotropy and appear substantially transparent; and
    applying said range ofhigh frequency electric field to cause both said layers to exhibit a negative dielectric anisotropy and to reflect both right and left circularly polarized light within a predetermined spectrum of light while allowing remaining spectrums of light to be transmitted.

14. The method according to claim 13, further comprising the step of:
    providing a transition time of about 1 second or less between said positive dielectric anisotropy and said negative dielectric anisotropy.

15. The method according to claim 8, wherein said steps for simultaneously applying further comprise the steps of:
    applying a first low frequency electric field to said layers to obtain a substantially transparent homeotropic texture;
    applying a first high frequency electric field to said layers to obtain a transient planar texture;
    applying a second different low frequency electric field to said layers to initiate transition from a transient planar texture; and
    applying a second different high frequency electric field to said layers to obtain a substantially reflective planar texture.

16. The method according to claim 15, further comprising the step of:
    providing a transition time of about 100 milliseconds or less between said substantially transparent homeotropic texture and said substantially reflective planar texture.

17. The method according to claim 8, further comprising the step of:
    providing a transition time of about 50 milliseconds or less between said first texture and said second texture.

* * * * *